April 28, 1942.          J. W. SAFFOLD          2,280,857
OIL SEAL
Filed Aug. 17, 1939          2 Sheets-Sheet 2

James Webb Saffold
INVENTOR.
BY Horace B. Fay
ATTORNEY.

Patented Apr. 28, 1942

2,280,857

UNITED STATES PATENT OFFICE 2,280,857

OIL SEAL

James Webb Saffold, Cleveland, Ohio

Application August 17, 1939, Serial No. 290,641

1 Claim. (Cl. 286—5)

This invention relates, as indicated, to an oil seal, but has reference more particularly to a seal which is especially adapted for preventing escape of oil from the bearings of wheel and axle assemblies, as employed in automotive vehicles.

Attempts have heretofore been made to provide seals for the aforesaid purpose, but in each case, the elements of which the seal is composed are either worn out by the rotation of the wheel or are attacked or corroded by the grease or oil which comes into contact with the seal. This necessitates frequent replacement or renewal of parts and renders the cost of maintenance prohibitive in most cases.

The present invention has as its primary object the provision of an oil seal which is inexpensive to manufacture and install, which is highly efficient for its intended purposes, and which is virtually free from corrosion or wear.

Other objects and advantages of the invention will be apparent during the course of the following description.

In the accompanying drawings, forming a part of this specification, and in which like numerals are employed to designate like parts throughout the same, Fig. 1 is a fragmentary cross-sectional view of a wheel and axle assembly embodying the novel oil seal;

Figure 1:
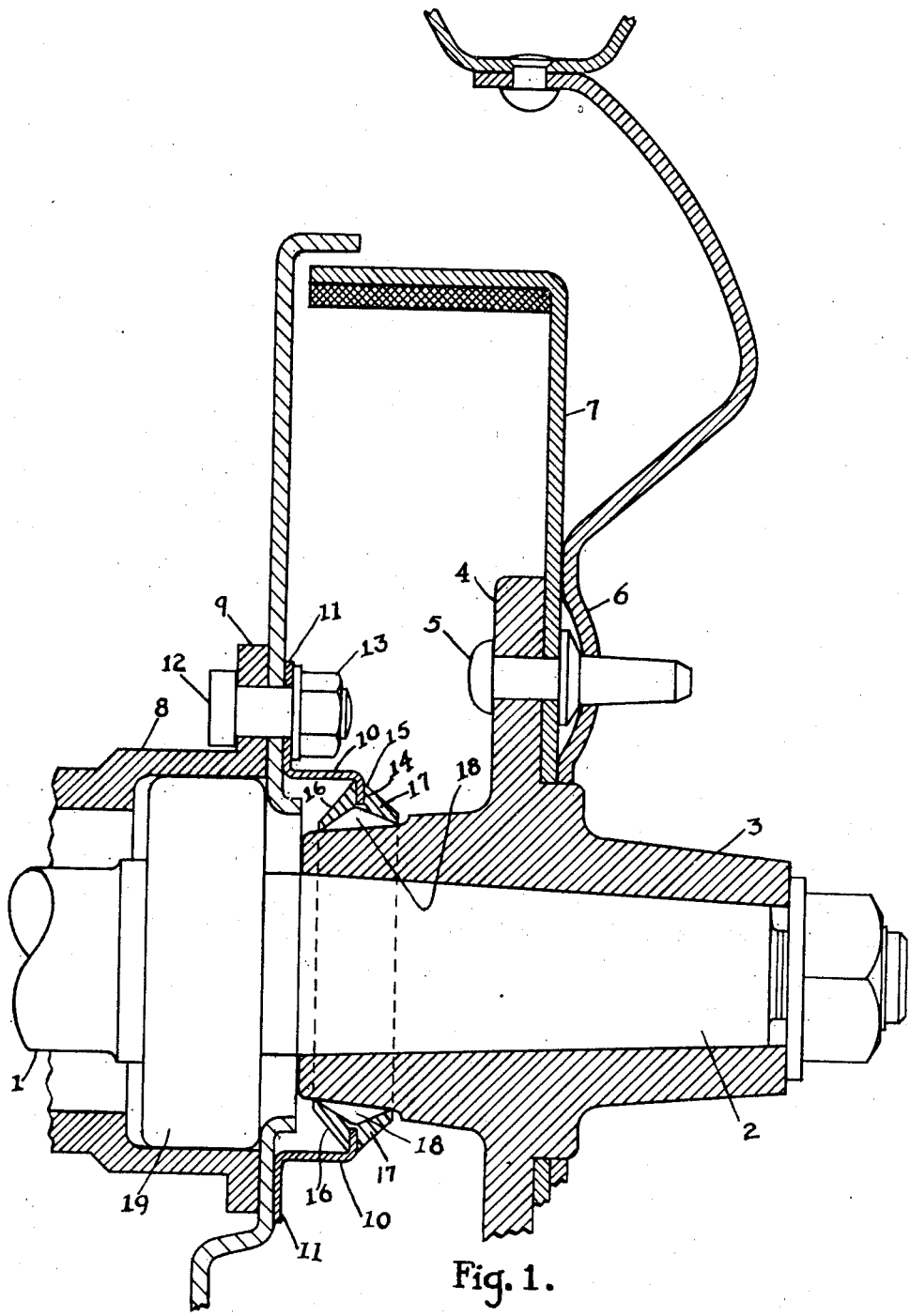

Referring more particularly to the drawings, Fig. 1 discloses a wheel and axle assembly comprising an axle 1 having a tapered end 2, on which a hub 3 is mounted, the hub being provided with a flange 4 to which are secured as by means of bolts 5, the wheel 6 and a brake drum 7.

The axle 1 is enclosed by the axle housing 8 which is provided with a flange 9 to which the oil seal of the present invention is secured.

The oil seal comprises an annular member 10 formed of sheet metal and provided with a radially-extending flange 11, whereby the member is secured to the flange 9 of the axle housing, as by means of bolts 12 and nuts 13, and is further provided with an inwardly-extending radial flange 14, which supports a ring 15, of V-shaped cross-section, and formed of synthetic rubber, such for example as "Duprene" or "Thiokol."

Figure 4:
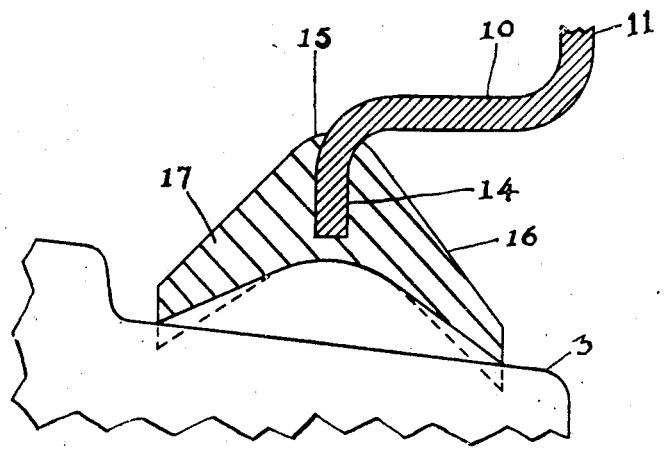
Fig. 4 is an enlarged detail of the oil seal.
Figure 2:
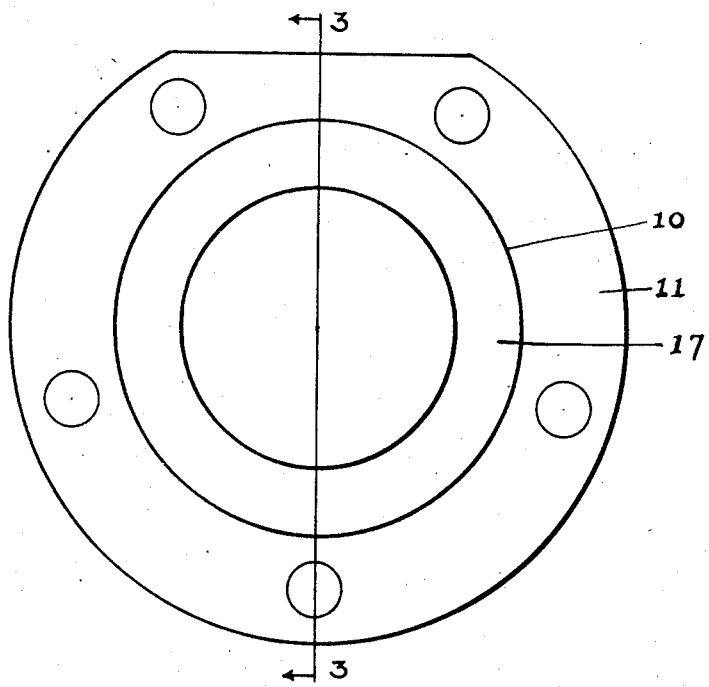
Fig. 2 is a plan view of the oil seal.
Figure 3:
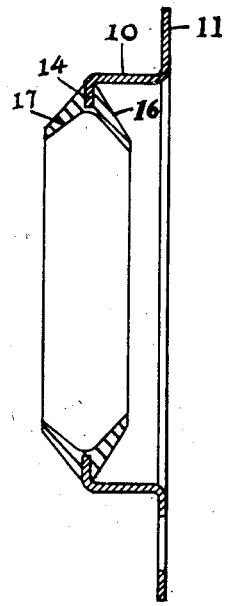
Fig. 3 is a cross-sectional view of the oil seal, taken on the line 3—3 of Fig. 2.

The ring 15 comprises diverging tapered flanges 16 and 17 which engage the inboard portion of the hub 3 and are flexed outwardly to some extent by said hub, as indicated by the solid lines in Fig. 4. The space 18 between the flanges 16 and 17 of the rubber ring 15 and the hub 3 is adapted to be filled with grease or a similar lubricant.

The rubber ring and the grease thus form a seal at this point which is effective to prevent escape of oil or grease from the bearings 19, and since the flanges 16 and 17 of the ring are under constant tension, the grease within the ring cannot escape or leak out while the ring and hub are stationary. Moreover, the ring being made of a synthetic rubber which is not injured or otherwise affected by the grease, will last indefinitely. Such grease as finds its way between the ends of the flanges 16 and 17 and the adjacent portions of the hub forms a lubricating film which is effective to prevent abrasion or wear of the rubber ring. If, when the vehicle is started, lubricant has worked its way to said ends of the flanges 16 and 17, in quantities beyond what are needed for said lubricating film, centrifugal force will urge the excess back into the space 18, thus preventing seeping out or throwing off of the lubricant.

It is to be understood that the form of my invention, herein shown and described, is to be taken as a preferred example of the same, and that various changes in the shape, size and arrangement of parts may be resorted to, without departing from the spirit of my invention, or the scope of the subjoined claim.

Having thus described my invention, I claim:

The combination with relatively rotatable members, of a unitary oil seal cooperating therewith, said seal comprising a metal holder provided with an annular flange, a one-piece, annular member formed of synthetic rubber having a thickened portion, said flange being embedded in and bonded to said thickened portion to secure said annular member against rotation relative to said flange, and being provided with tapered spaced flanges diverging toward and engaging said rotatable member and terminating in relatively sharp edges, said annular member being of less initial diameter at said edges than the diameter of the rotatable member at points respectively engaged by said edges whereby said flange edges engage said member under tension with a pressure dependent solely upon the resiliency of the material and forming with said rotatable member a relatively deep, annular grease chamber about said member, the tapered flanges engaging said rotatable member by a line contact and presenting surfaces converging away from the rotatable member to force grease from the edges of the flanges back into said grease chamber by centrifugal force as the rotatable member rotates.

JAMES WEBB SAFFOLD.